United States Patent
Collard

Patent Number: 5,820,315
Date of Patent: Oct. 13, 1998

[54] HOLE SAW ROLLER GUIDE

[76] Inventor: Bobby J. Collard, 405 Brookview, Garland, Tex. 75043

[21] Appl. No.: 866,683

[22] Filed: May 30, 1997

Related U.S. Application Data

[60] Provisional application No. 60/019,576 Jun. 11, 1996.

[51] Int. Cl.[6] ..................................................... B23B 41/00
[52] U.S. Cl. ........................... 408/80; 408/204; 408/207; 408/209
[58] Field of Search .............................. 408/80, 204, 207, 408/209

[56] References Cited

U.S. PATENT DOCUMENTS

| | | | |
|---|---|---|---|
| 2,374,552 | 4/1945 | Marini | 408/201 |
| 3,884,593 | 5/1975 | Christoffer | 408/16 |
| 4,203,692 | 5/1980 | Jensen | 408/96 |
| 4,579,486 | 4/1986 | Damico | 408/204 |
| 4,749,315 | 6/1988 | Mills | 408/80 |
| 4,968,189 | 11/1990 | Pidgeon | 408/1 |
| 5,366,326 | 11/1994 | Converse | 408/72 |
| 5,393,175 | 2/1995 | Courville | 408/56 |
| 5,413,437 | 5/1995 | Bristow | 408/1 |

FOREIGN PATENT DOCUMENTS

| | | | |
|---|---|---|---|
| 61-152309 | 7/1986 | Japan | 408/80 |
| 3208511 | 9/1991 | Japan | 408/204 |

*Primary Examiner*—Daniel W. Howell
*Assistant Examiner*—Adesh Bhargava
*Attorney, Agent, or Firm*—John A. Thomas

[57] ABSTRACT

A shaft sized to fit conventional hole saw mandrels has two set screw flats and a retaining head. A cylindrical roller is mounted on the shaft against the retaining head, and a cylindrical spacer is mounted by set screws on the shaft above the roller. The roller is sized to fit the diameter of holes typically desired to be enlarged. The shaft, roller and spacer assembly is mounted in the mandrel of a conventional hole saw using the second set screw flat so that the roller extends beyond the cutting edge of the saw. The roller is inserted into the existing hole and guides the hole saw as the hole saw is turned by a drill or other means. In an alternate embodiment, the roller has side flats, allowing the device to enlarge oblong holes having parallel sides.

8 Claims, 4 Drawing Sheets

HOLE SAW ROLLER GUIDE

CLAIM FOR PRIORITY

This application claims the benefit of the filing date of that certain provisional patent application disclosing the same invention, titled "Hole Saw Roller Guide" and filed Jun. 11, 1996 under application Ser. No. 60/019,576.

BACKGROUND

Hole saws are used for cutting circular holes of standard diameters. Such saws are well known in the art. Generally, the saw is attached to a drill bit which acts as a pilot to guide the hole saw and keep it centered about the point where the pilot drill enters.

However, when a hole is drilled incorrectly, or when a craftsman must enlarge an existing hole having a diameter larger than that of the pilot drill, it becomes difficult to recut the hole with a hand drill, since the pilot drill cannot be stabilized about the center of an existing hole. In some cases, such as with electrical box knock-outs, the hole may have been pre-punched during manufacture, yet must be enlarged at the site of installation. The usual practice is to plug the existing hole first, which is expensive and time-consuming. It is desirable to provide a hole saw which would provide correct centering for a new hole without having to plug the existing hole. The present invention provides such a device. Moreover, unlike the prior-art solutions to this problem, the present invention is mechanically simple and easy for the craftsman to set up and use.

SUMMARY

The present invention provides a hole saw which can quickly and easily enlarge an existing hole with correct centering, and without having to first plug the existing hole. Moreover, the present invention can be manufactured simply and inexpensively, and it requires no calibration, adjusting, or involved setup on the part of the craftsman.

In the preferred embodiment, a shaft is provided which has a diameter equal to that of a conventional hole saw pilot drill on its first end and a retaining head on its second end. The shaft carries a concentric roller, which is sized to fit the standard holes drilled by hole saws, or punched, for example, in electrical box knock-outs. The roller is held on the second end of the shaft by the retaining head. A spacer, also concentric on the shaft, is positioned above the roller and attached to the shaft. The spacer has a diameter equal to or slightly less than the inside diameter of the particular hole saw most likely to be used to enlarge the existing hole. The shaft, roller, and spacer fit inside a conventional hole saw, of the type having a mandrel for fitting a pilot drill, and are fastened thereto by means such as a set screw. The first end of the shaft is then chucked into an electric drill which turns the shaft and the connected hole saw.

In an alternate embodiment, the roller has two opposed flats, so that it fits within oblong holes typically punched into sheet metal boxes. This alternate embodiment allows such a hole to be enlarged to a circular hole.

DRAWINGS

DESCRIPTION

Figure 1:
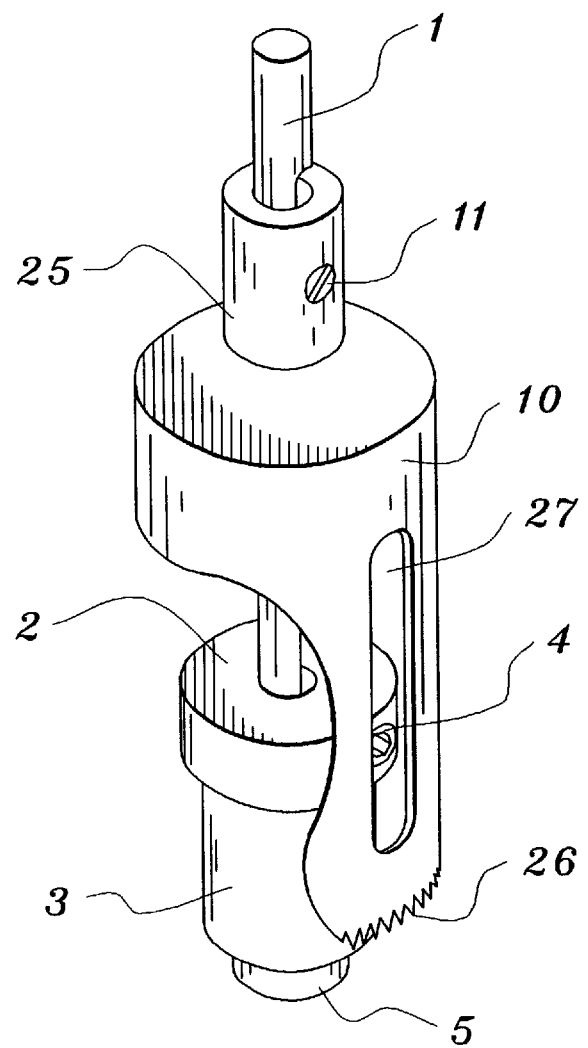
FIG. 1 is a cut-away perspective view of a hole saw with the preferred embodiment of the invention mounted in it.
Figure 2:
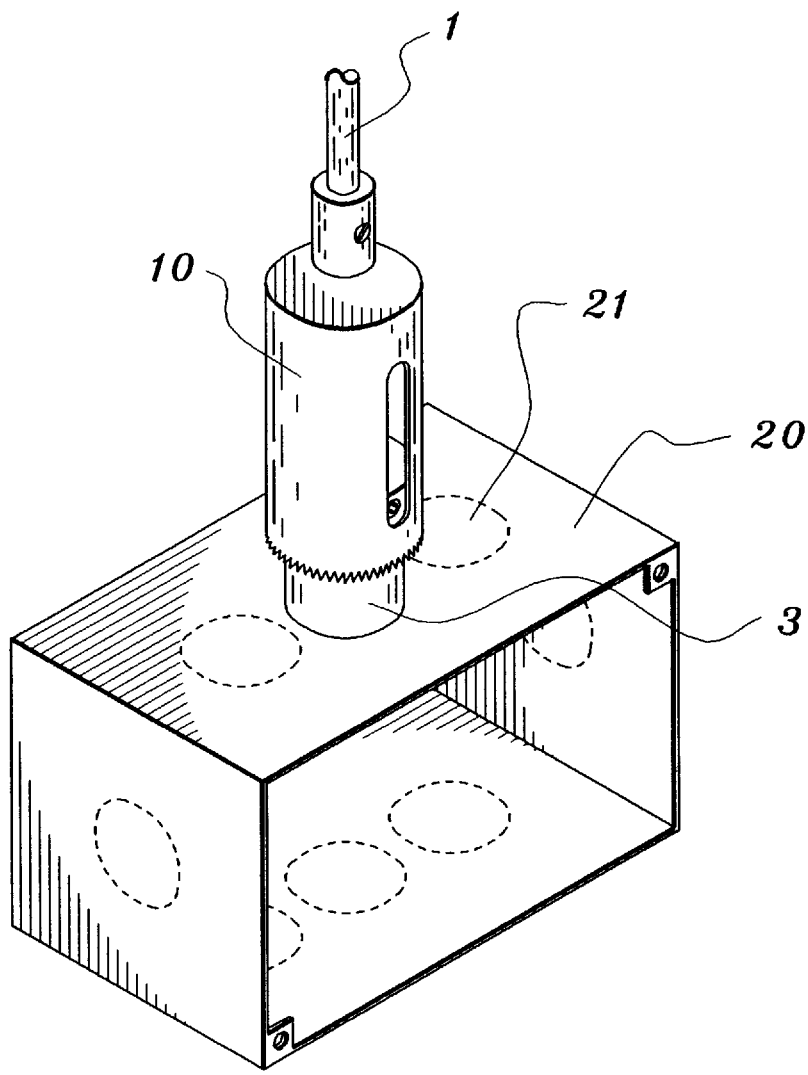
FIG. 2 is a perspective view of the preferred embodiment mounted in a hole saw and being used to enlarge a hole in a sheet metal box.

FIGS. 1 and 2 show a conventional hole saw 10 of the type having an integral mandrel or arbor 25, and a cutting edge 26. Typically the mandrel 25 has a set screw 11 as shown in FIG. 1. The set screw is used to firmly fix the hole saw 10 to a pilot drill. In the preferred embodiment, the shaft 1 of the hole saw roller guide passes through the hole saw mandrel 25 and is held in position by the set screw 11. In use, the shaft 1 is typically chucked in a rotating driving means, such as an electric drill. FIG. 1 is a cut-away perspective view showing the spacer 2, the set screw hole 4 for the set screw 12 holding the spacer to the shaft 1 and the roller 3, all of these elements fitting into the cavity 27 of the hole saw 10. The spacer 2 is chosen to have a diameter slightly less than that of the inside diameter of the hole saw to be used. The spacer 2 prevents the hole saw 10 from wobbling on the shaft 1, especially during the beginning of the sawing process. The roller 3 is chosen to have a diameter equal to or slightly less than that of the existing hole to be enlarged. As shown in FIGS. 1 and 2, the present embodiment is mounted in the hole saw mandrel 25 so that the roller 3 extends below the cutting edge of the hole saw 10. This allows the hole saw 10 to be stabilized concentrically about the center of the existing hole before its cutting edge contacts the work surface.

FIG. 2 shows a hole saw fitted with the preferred embodiment entering an existing hole in a sheet metal electrical box 20. Boxes of this type typically have punched knockouts 21 of a standard diameter. The present invention makes it easy to enlarge the holes left after removal of such knockouts 21. FIG. 2 shows the roller 3 entering an existing hole.

Figure 3:
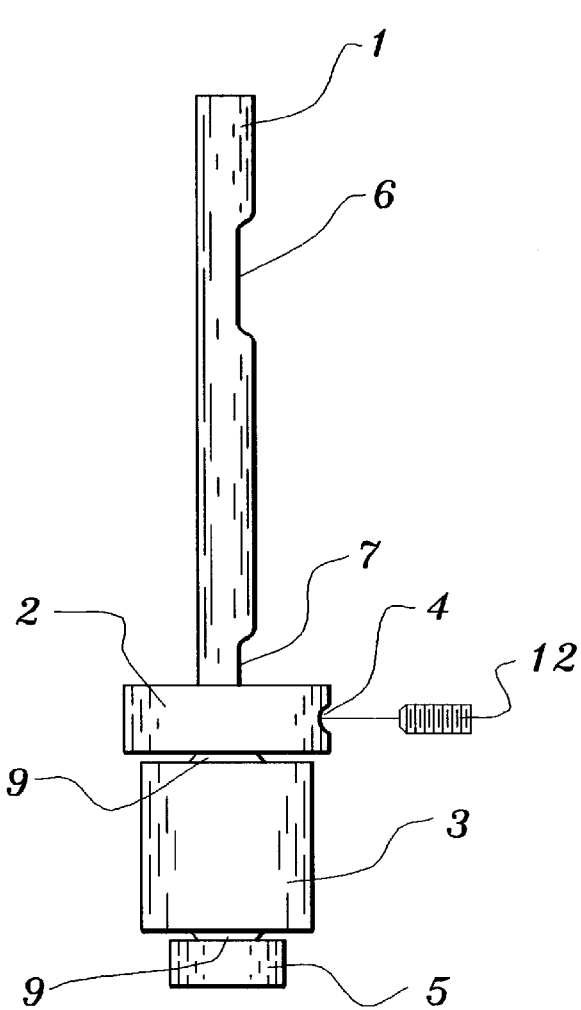
FIG. 3 is a side view of the preferred embodiment, as assembled.
Figure 4:
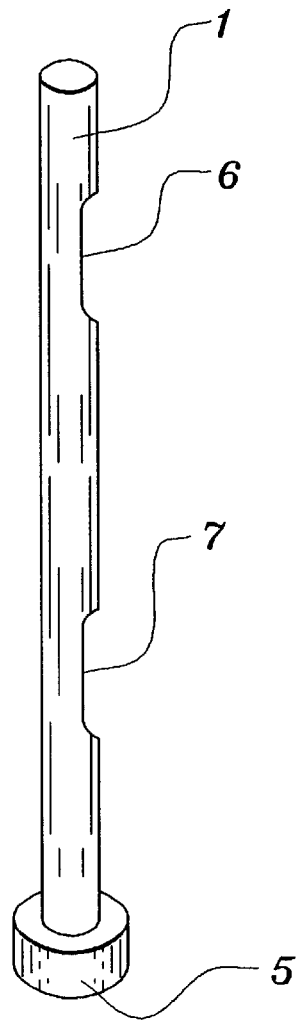
FIG. 4 is a perspective view of the shaft of the preferred embodiment.

FIG. 3 shows the complete assembly of the preferred embodiment. The shaft 1, is shown alone in FIG. 4. The shaft has a head 5 to retain the roller. The shaft has two flats 6 and 7 to receive and provide seating for set screws. The upper flat 6 receives the set screw in the mandrel 25 of the conventional hole saw, and the lower flat 7 receives the set screw 12 which fixes the spacer 2 to the shaft 1.

Figure 5:
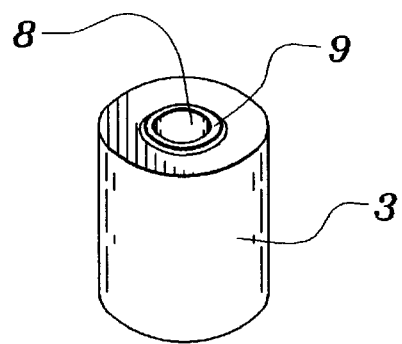
FIG. 5 is a perspective view of the roller member.
Figure 6:
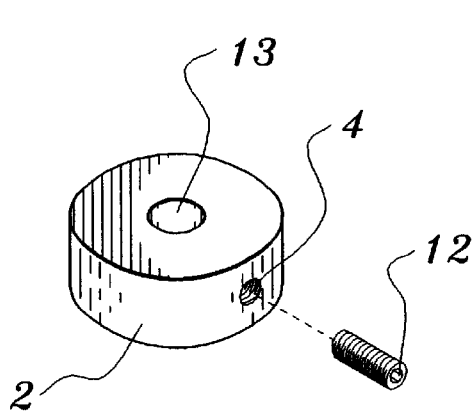
FIG. 6 is a perspective view of the spacer member.

The roller, shown alone in FIG. 5, has an axial bore 8 for receiving the shaft 1. The top and bottom surfaces of the roller have lands 9 concentric with the bore 8. Although not essential, the lands 9 reduce friction between the roller 3 and the spacer 2 and the head 5 of the shaft. The spacer 2, shown alone in FIG. 6, also has an axial bore 13, for receiving the shaft 1.

Figure 7:
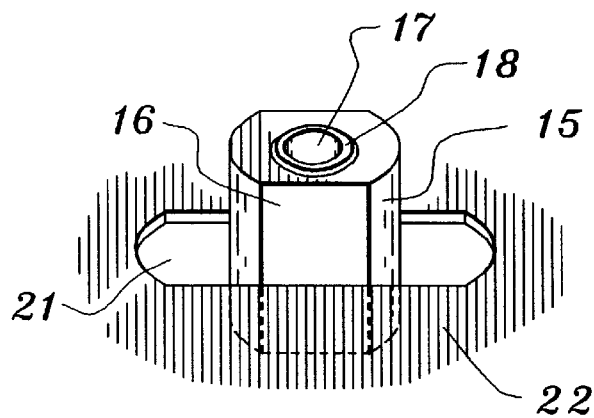
FIG. 7 is a perspective view of the roller member of the alternate embodiment, positioned in a oblong hole.

FIG. 7 shows an alternate embodiment of the invention where the roller 15 has flats 16 on opposing sides of the roller. The roller 15 has an axial bore 17 for receiving a shaft 1, and upper and lower lands 18. In other respects, the alternate embodiment is assembled and used in a hole saw in the same manner shown in FIGS. 1, 2 and 3. FIG. 7 shows the roller 15 of the alternate embodiment inserted into an oblong existing hole 21 having parallel sides in a sheet metal surface 22, which hole is to be enlarged and made circular. The flats 16 on the roller 15 prevent its rotation in the oblong hole 21 and allow the operator to maintain the hole saw 10 in position for the desired circular cut.

The reader will see that the need for a simple but effective means to enlarge existing holes has been attained by the present invention, as described above. Since certain changes could be made in the embodiment of the invention described above without departing from the spirit and scope of the invention, I intend that all matter contained in the foregoing description and drawings shall be interpreted as illustrative and not in a limiting sense.

I claim:

1. A hole saw roller guide for cutting a concentric enlargement of an existing hole comprising:
   a. a shaft having a head on one end thereof; the shaft further having a diameter adapted to fit a rotating driving means;
   b. a spacer having an axial bore; the spacer disposed on the shaft by passage of the shaft through the spacer axial bore;
   c. means for fixing the spacer to the shaft at a predetermined position;
   d. a hole saw disposed on the shaft; the hole saw having a cutting edge; the hole saw further having a cavity; the cutting edge of the hole saw and the cavity of the hole saw opposing the end of the shaft having the head;
   e. means for fixing the hole saw to the shaft so that the spacer is received into the cavity of the hole saw, and;
   f. a roller having an axial bore; the roller disposed on the shaft between the spacer and the head by passage of the shaft through the roller axial bore; the roller retained on the shaft by the head and extending beyond the cutting edge of the hole saw;
   g. the roller further having a predetermined diameter chosen to fit within the existing hole;
whereby the roller guides the hole saw so that the the cutting edge is concentric with the existing hole.

2. The hole saw roller guide of claim 1 above where the roller has upper and lower lands.

3. The hole saw roller guide of claim 1 above where the means for fixing the spacer to the shaft comprises a set screw.

4. The hole saw roller guide of claim 1 above where the means for fixing the hole saw to the shaft comprises a set screw.

5. A hole saw roller guide for cutting a concentric enlargement of an existing hole, the existing hole having at least two parallel flat sides, comprising:
   a. a shaft having a head on one end thereof; the shaft further having a diameter adapted to fit a rotating driving means;
   b. a spacer having an axial bore; the spacer disposed on the shaft by passage of the shaft through the spacer axial bore;
   c. means for fixing the spacer to the shaft at a predetermined position;
   d. a hole saw disposed on the shaft; the hole saw having a cutting edge; the hole saw further having a cavity; the cutting edge of the hole saw and the cavity of the hole saw opposing the end of the shaft having the head;
   e. means for fixing the hole saw to the shaft so that the spacer is received into the cavity of the hole saw, and;
   f. a roller having an axial bore; the roller disposed on the shaft between the spacer and the head by passage of the shaft through the roller axial bore; the roller retained on the shaft by the head and extending beyond the cutting edge of the hole saw; the roller further having opposed flats corresponding to the parallel flat sides of the existing hole;
   g. the roller further having a pre-determined width in the portion thereof having opposed flats; the width chosen to fit within the existing hole;
whereby the roller guides the hole saw so that the the cutting edge is concentric with the existing hole.

6. The hole saw roller guide of claim 5 above where the roller has upper and lower lands.

7. The hole saw roller guide of claim 5 above where the means for fixing the spacer to the shaft comprises a set screw.

8. The hole saw roller guide of claim 5 above where the means for fixing the hole saw to the shaft comprises a set screw.

* * * * *